United States Patent
Takeda et al.

(10) Patent No.: US 12,232,192 B2
(45) Date of Patent: Feb. 18, 2025

(54) BASE STATION APPARATUS, TERMINAL APPARATUS, AND CONTROL METHODS FOR THE SAME FOR CELLULAR COMMUNICATION NETWORK IN WHICH RELAY COMMUNICATION IS PERFORMED

(71) Applicant: KDDI CORPORATION, Tokyo (JP)

(72) Inventors: Hiroki Takeda, Tokyo (JP); Xiao Shao, Tokyo (JP); Yasutomo Miyake, Tokyo (JP); Shingo Watanabe, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 18/394,860

(22) Filed: Dec. 22, 2023

(65) Prior Publication Data

US 2024/0129962 A1    Apr. 18, 2024

Related U.S. Application Data

(63) Continuation of application No. 16/995,920, filed on Aug. 18, 2020, now Pat. No. 11,877,325, which is a continuation of application No. PCT/JP2019/005380, filed on Feb. 14, 2019.

(30) Foreign Application Priority Data

Feb. 22, 2018  (JP) .................................. 2018-029466
Mar. 22, 2018  (JP) .................................. 2018-054512

(51) Int. Cl.
*H01H 47/00*  (2006.01)
*H04W 72/04*  (2023.01)
*H04W 76/10*  (2018.01)

(52) U.S. Cl.
CPC ........... *H04W 76/10* (2018.02); *H04W 72/04* (2013.01)

(58) Field of Classification Search
None
See application file for complete search history.

(56) References Cited

U.S. PATENT DOCUMENTS

| 9,148,217 | B2 | 9/2015 | Kim et al. |
| 10,716,062 | B1 | 7/2020 | Kato et al. |
| 11,700,565 | B2 * | 7/2023 | Hampel ................ H04W 76/19 370/227 |

(Continued)

FOREIGN PATENT DOCUMENTS

| CN | 101960737 A | 1/2011 |
| EP | 2 296 420 A1 | 3/2011 |

(Continued)

OTHER PUBLICATIONS

"3rd Generation Partnership Project; Technical Specification Group Radio Access Network; Evolved Universal Terrestrial Radio Access (E-UTRA); Relay architectures for E-UTRA (LTE-Advanced)", Release 9, 3GPP TR 36.806, V9.0.0, Mar. 2010, 34 pages.

(Continued)

*Primary Examiner* — Stephen W Jackson
(74) *Attorney, Agent, or Firm* — Foley & Lardner LLP

(57) ABSTRACT

A base station apparatus, configured to establish a wireless link for a backhaul line with a relay apparatus, and provide a first period in which a radio resource is used by the base station apparatus for the backhaul line, and a second period in which the radio resource is not used by the backhaul line.

5 Claims, 8 Drawing Sheets

(56) References Cited

U.S. PATENT DOCUMENTS

| | | |
|---|---|---|
| 2007/0010271 A1 | 1/2007 | Roy |
| 2007/0195799 A1 | 8/2007 | Kanazawa et al. |
| 2008/0080436 A1 | 4/2008 | Sandhu et al. |
| 2009/0213730 A1 | 8/2009 | Zeng et al. |
| 2009/0252088 A1 | 10/2009 | Rao et al. |
| 2011/0065379 A1 | 3/2011 | Sakoda et al. |
| 2013/0053048 A1 | 2/2013 | Garcia et al. |
| 2017/0033860 A1* | 2/2017 | Monzen .............. H04B 7/15507 |
| 2017/0208574 A1 | 7/2017 | Ramakrishna et al. |
| 2022/0159771 A1* | 5/2022 | Fujishiro ............... H04W 40/34 |
| 2023/0308138 A1* | 9/2023 | Tango .................... H04B 7/155 |

FOREIGN PATENT DOCUMENTS

| | | |
|---|---|---|
| JP | 2008-547266 A | 12/2008 |
| JP | 2010-501140 A | 1/2010 |
| JP | 4392789 B2 | 1/2010 |
| JP | 2013-080986 A | 5/2013 |
| JP | 2017-212714 A | 11/2017 |

OTHER PUBLICATIONS

"3rd Generation Partnership Project; Technical Specification Group Radio Access Network; Evolved Universal Terrestrial Radio Access (E-UTRA); Relay radio transmission and reception (Release 11)", 3GPP TR 36.826, V11.0.0, Sep. 2012, 78 pages.

Chinese Office Action issued in corresponding Chinese Application No. 201980013594.0 dated Jan. 6, 2022 with English translation.

Extended European Search Report for corresponding divisional European Patent Application No. 23179903.2 dated Sep. 22, 2023 (11 pages).

Extended European Search Report issued in corresponding European Application No. 19757601.0 dated Apr. 9, 2021.

Huawei et al., "Consideration on IAB physical layer enhancement", 3GPP TSG RAN WG1 Meeting #91, R1-1720606, 2017, 7 pages Retrieved from the Internet: URL:http://www.3gpp.org/ftp/tsg%5Fran/WG1%5FRL1/TSGR1%5F91/Docs/ [retrieved on Nov. 18, 2017].

JP Office Action issued in corresponding Japanese Patent Application No. 2021-119826, dated Aug. 19, 2022 with English translation (8 pages).

Motorola, "Relay Performance Evaluation with Backhaul Subframe Dynamic Partitioning and Enhancement Techniques—System Simulations", 3GPP TSG RAN WG1 Meeting #60bis R1-102131, 2010, 20 pages [retrieved on Apr. 6, 2010].

Motorola, "Relay System Performance for Downlink with Latest Backhaul Link Models", 3GPP TSG RAN1 #58 R1-093428, Aug. 24-28, 2009 (8 pages).

Nokia Siemens Networks, Nokia, "Channel model for Relay to UE link", 3GPP TSG RAN WG1 Meeting #56bis R1-091358, Mar. 23-27, 2009 (3 pages).

Office Action issued in corresponding Japanese Patent Application No. 2018-054512 dated Jun. 7, 2021 with machine English translation.

Qualcomm Europe "Operation of relays in LTE-A", 3GPP TSG-RAN WG1 #54 R1-083191, Aug. 18-Aug. 22, 2009 (5 pages).

U.S. Non-Final Office Action in U.S. Appl. No. 16/995,920 dated Jun. 21, 2023 (6 pages).

U.S. Notice of Allowance in U.S. Appl. No. 16/995,920 dated Nov. 20, 2023 (5 pages).

U.S. Non-Final Office Action for U.S. Appl. No. 18/636,776 dated Jun. 17, 2024 (7 pages).

\* cited by examiner

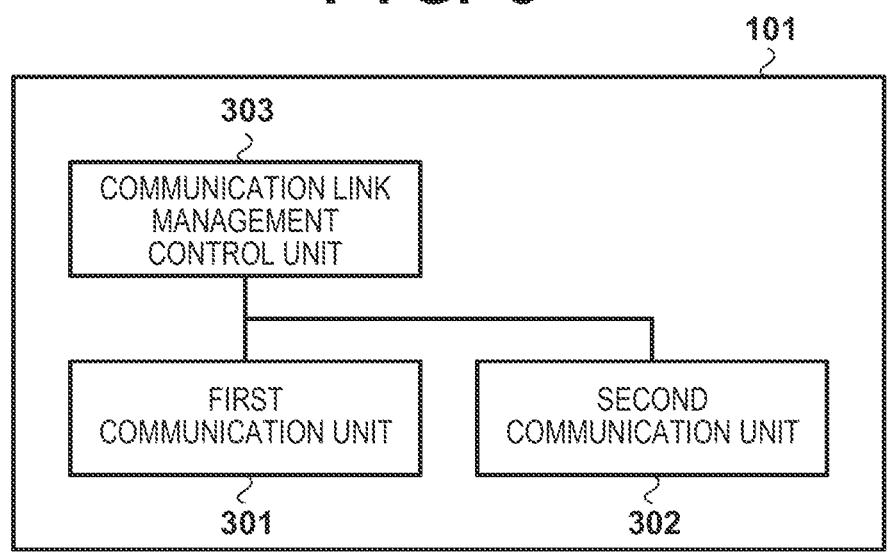
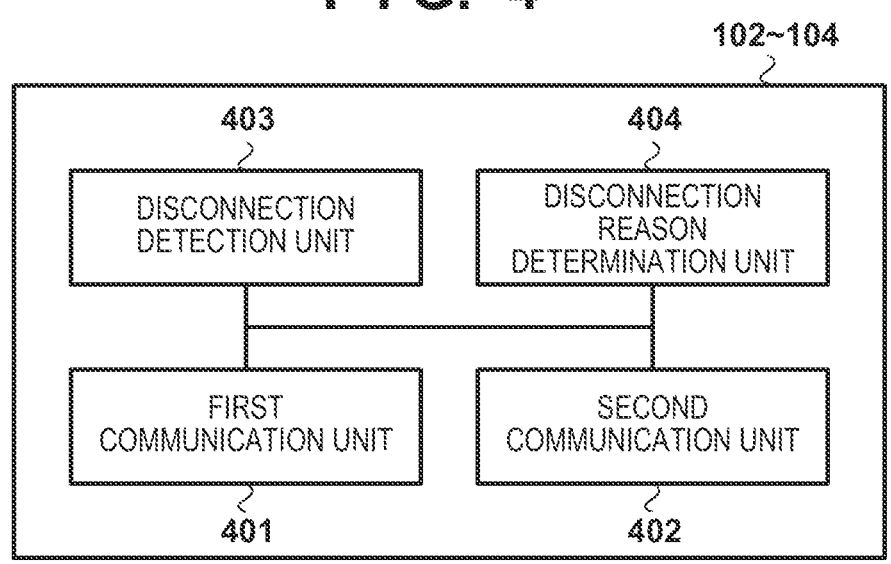

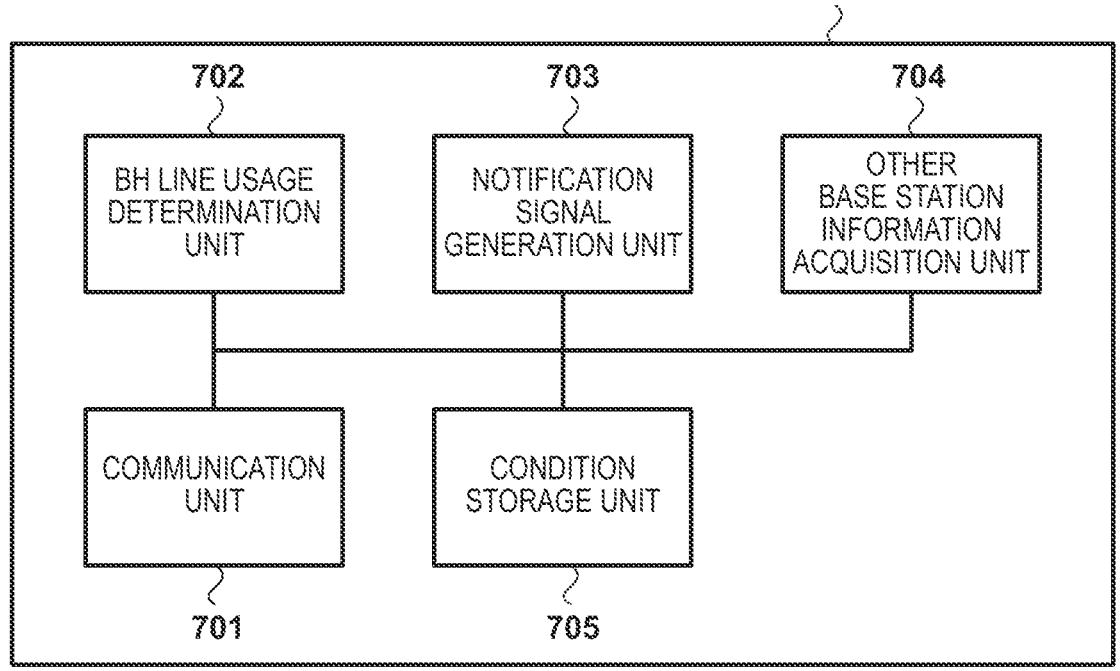
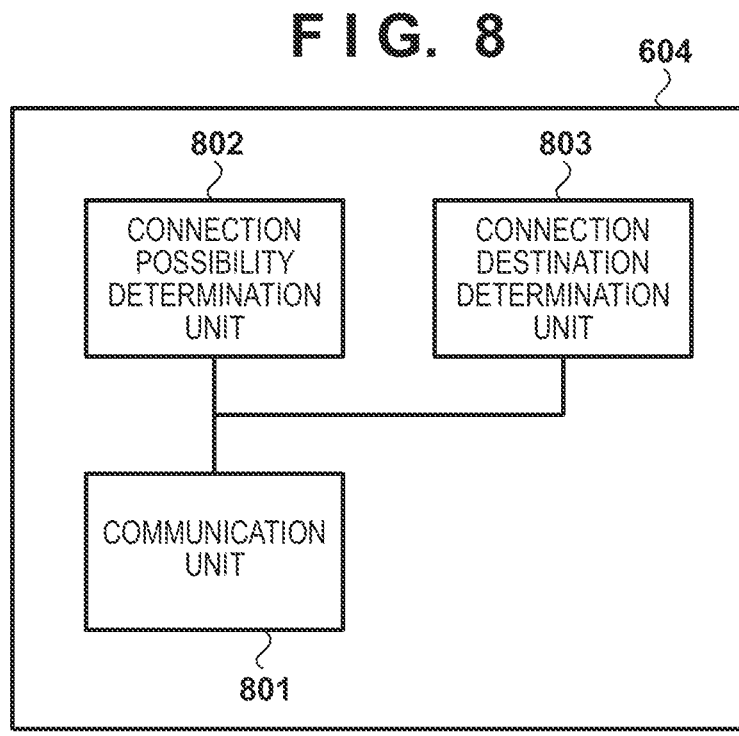

BASE STATION APPARATUS, TERMINAL APPARATUS, AND CONTROL METHODS FOR THE SAME FOR CELLULAR COMMUNICATION NETWORK IN WHICH RELAY COMMUNICATION IS PERFORMED

CROSS-REFERENCE TO RELATED APPLICATION(S)

This application is a continuation of U.S. patent application Ser. No. 16/995,920 filed on Aug. 18, 2020, which is a continuation of International Patent Application No. PCT/JP2019/005380 filed on Feb. 14, 2019, which claims priority to and the benefit of Japanese Patent Application No. 2018-029466 filed Feb. 22, 2018, and Japanese Patent Application No. 2018-054512 filed Mar. 22, 2018, the entire disclosures of which are incorporated herein by reference.

BACKGROUND OF THE INVENTION

Field of the Invention

The present invention relates to abase station, a terminal apparatus, and control methods for the same, and specifically relates to a control technique used during relay communication in a wireless communication network.

Description of the Related Art

In the 3rd Generation Partnership Project (3GPP), a relay communication technique for enabling communication between a base station apparatus and a remote terminal has been discussed (see 3GPP TR 36.806, V9.0.0, March 2010 and 3GPP TR 36.826, V11.0.0, September 2012). In relay communication, one or more relay apparatuses are included on a communication path between a base station apparatus and a terminal. Also, the one or more relay apparatuses receive a signal transmitted from the base station apparatus and transfer the signal to the terminal apparatus, and receive a signal transmitted from the terminal apparatus and transfer the signal to the base station apparatus.

In relay communication, several problems can occur accompanying establishment of a wireless link between the base station apparatus and the relay apparatus.

SUMMARY OF THE INVENTION

The present invention provides a technique for solving at least one of the problems in relay communication.

The base station apparatus according to an aspect of the present invention is configured to establish a wireless link for a backhaul line with a relay apparatus, and provide a first period in which a radio resource is used by the base station apparatus for the backhaul line, and a second period in which the radio resource is not used by the backhaul line.

Also, the terminal apparatus according to another aspect of the present invention is configured to request a connection of an access line to a base station apparatus in a second period provided by the base station, wherein the base station apparatus is configured to establish a wireless link for a backhaul line with a relay apparatus, and provide a first period in which a radio resource is used by the base station apparatus for the backhaul line, and the second period in which the radio resource is not used by the backhaul line.

Further features of the present invention will become apparent from the following description of exemplary embodiments (with reference to the attached drawings).

BRIEF DESCRIPTION OF THE DRAWINGS

FIG. 3 is a diagram showing an example of a functional configuration of the control apparatus according to the first embodiment.

FIG. 4 is a diagram showing an example of a functional configuration of a relay apparatus according to the first embodiment.

FIG. 7 is a diagram showing an example of a functional configuration of a base station apparatus according to the second embodiment.

FIG. 8 is a diagram showing an example of a functional configuration of a terminal apparatus according to the second embodiment.

DESCRIPTION OF THE EMBODIMENTS

Hereinafter, embodiments will be described in detail with reference to the attached drawings.

First Embodiment

In the following embodiments, a case will be discussed in which relay communication is performed using a communication path that includes multiple relay apparatuses and includes multiple wireless link segments. In this kind of relay communication, if some of the segments has been disconnected, a communication apparatus (a base station apparatus or a relay apparatus) that forms a wireless link for that segment can recognize the disconnection, but the other communication apparatuses on the communication path cannot recognize the disconnection. For this reason, even though some of the segments of the communication path has been disconnected, the communication apparatuses that cannot recognize the disconnection will attempt relay communication and waste radio resources and consumed power. Also, if the control apparatus that manages the communication path cannot recognize the disconnection, reconfiguration of the communication path cannot be performed, and the amount of time for which communication is not possible may be elongated. The present embodiment provides a solution for this kind of problem.

System Configuration

Figure 1:
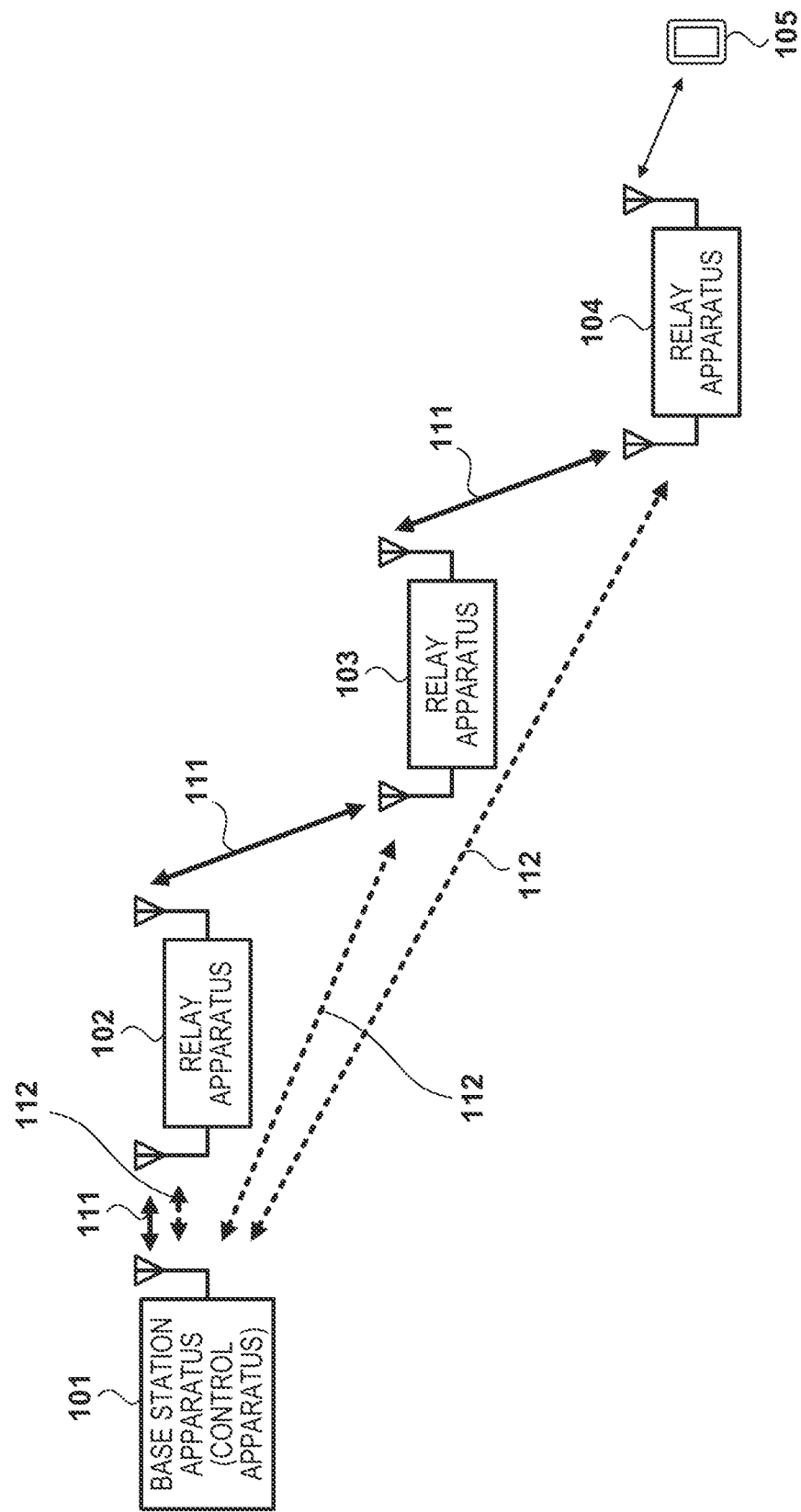
FIG. 1 is a diagram showing an example of a configuration of a wireless communication system accompanying relay transmission according to a first embodiment.

FIG. 1 shows an example of a configuration of a wireless communication system according to the present embodiment. The present wireless communication system is constituted by including a base station apparatus 101, multiple relay apparatuses 102 to 104, and a terminal apparatus 105. In FIG. 1, the communication between the base station apparatus 101 and the terminal apparatus 105 is relayed by the relay apparatuses 102 to 104. Note that FIG. 1 shows an example, and for example, the number of relay apparatuses that relay communication between the base station apparatus 101 and the terminal apparatus 105 is not limited to three. Also, although FIG. 1 illustrates only the communication link between the base station apparatus 101 and the terminal apparatus 105, separate communication links may be set for multiple terminal apparatuses. In the present embodiment, it is assumed that a tree-type network topology in which the base station apparatus 101 is the peak is used. Note that it is assumed that multiple segments Ill that constitute the communication link are formed using, for example, a fifth-generation cellular communication scheme (NR, New Radio). Note that, for example, a wireless communication line 112 using long-term evolution (LTE) can be used separately from a communication link relating to relay between the relay apparatuses and the base station apparatus 101. For example, the relay apparatuses can be configured to perform control communication with the base station apparatus 101 via the wireless communication line 112 using LTE and perform transfer of user data using NR.

Here, if the wireless link of a segment between the relay apparatus 102 and the relay apparatus 103 is unintentionally disconnected, the base station apparatus 101 and the relay apparatus 104 cannot recognize the disconnection. For this reason, even though the wireless link of the segment between the relay apparatus 102 and the relay apparatus 103 has been disconnected, the relay apparatus 104 may continue the relay of data from the terminal apparatus 105, or the base station apparatus 101 may continue to transmit the data addressed to the terminal apparatus 105 to the relay apparatus 102. If a tree-type network topology such as that shown in FIG. 1 is used, communication between the base station apparatus 101 and the terminal apparatus 105 is disconnected since a communication path that bypasses the disconnected segment has not been set. Also, the base station apparatus 101 recognizes that, for example, one of the segments of the communication link has been disconnected due to the fact that an acknowledgement response from the terminal apparatus 105 cannot be received. According to this, recognition of the disconnection takes time, and the base station apparatus 101 cannot recognize which segment of the communication link was disconnected. In response to this, for example, the relay apparatus 103 notifies the relay apparatus 104 that the communication segment between the relay apparatus 103 and the relay apparatus 102 has been disconnected, and the relay apparatus 102 can notify the base station apparatus 101 that the communication segment has been disconnected. However, in this case, for example, if the communication path created by the multiple relay apparatuses (not shown) is further constituted by the relay apparatus 104, the disconnection of the segment between the relay apparatus 102 and the relay apparatus 103 needs to be sequentially notified to these relay apparatuses. Also, if a segment located away from the base station apparatus 101 was disconnected, the wireless signal performing notification of the disconnection needs to be transmitted in many segments in order to cause the notification of the disconnection to reach the base station apparatus 101. That is, if some of the segments of the communication link created through relay is disconnected, when the disconnection is notified along the communication link, the wireless resources that are set individually are used in many segments, leading to waste of radio resources, in some cases. Also, in the notification along the communication link, the longer the length of the communication link is, the longer the amount of time until the notification is complete will be.

For this reason, in the present embodiment, when a wireless link of a communication segment between the relay apparatus 102 and the relay apparatus 103 is disconnected, information indicating that the relay apparatus 103 has detected the disconnection is notified to the base station apparatus 101 using the LTE wireless communication line 112. That is, if some of the segments of the wireless link formed by using relay between the base station apparatus 101 and the terminal apparatus 105 is disconnected, the relay apparatus on the downstream side in a view from the base station apparatus 101 among the relay apparatuses that perform communication of that segment performs notification of the disconnection to the base station apparatus 101 using a wireless communication line that can directly communicate with the base station apparatus 101. Note that the relay apparatus on the upstream side in a view from the base station apparatus 101 (e.g., the relay apparatus 102) may also perform this notification to the base station apparatus 101. Upon receiving this notification, the base station apparatus 101 uses the LTE wireless communication line 112 to perform notification of the fact that the wireless link of the communication segment on the upstream side of the relay apparatus was disconnected. At this time, if there are multiple relay apparatuses that are executing a relay operation in segments downstream of the disconnected segment, notification of the disconnection may also be performed all at once to those relay apparatuses. Accordingly, it is possible to achieve suppression of waste of radio resources and a reduction of the amount of time until the completion of notification compared to the case of sequentially performing notification of disconnection using the communication link obtained through relay.

Also, if notification of the disconnection is received from the relay apparatus, the base station apparatus 101 can receive the reason for the disconnection, which is included in the notification or is notified separately from the notification. Accordingly, the base station apparatus 101 can execute various types of control for maintaining the communication link with the terminal apparatus 105 depending on the reason for the disconnection.

For example, if the notified reason is deterioration of radio quality of the wireless link of the disconnected segment, the base station apparatus 101 can transmit an instruction signal for performing re-establishment of the wireless link of the segment by raising the transmission power of the signal with respect to the relay apparatus that formed the wireless link of the segment. That is, when notification of the fact that a wireless link of a wireless segment established by a relay apparatus has disconnected due to deterioration of the radio quality is received from the relay apparatus, the base station apparatus 101 can raise the transmission power to transmit an instruction signal instructing re-establishment of the wireless link to at least one of the relay apparatus and the partner apparatus of the relay apparatus in that communication segment. If a communication link of a disconnected segment is re-established due to the deterioration of the radio quality being improved by raising the transmission power, the communication link between the base station apparatus 101 and the terminal apparatus 105 that was established before can be maintained.

Also, if the notified reason is deterioration of the radio quality of the wireless link of the disconnected segment, the base station apparatus 101 can transmit an instruction signal for performing re-establishment of the wireless link of the segment by changing the used frequency or the communication timing with respect to the relay apparatus that formed the wireless link of the segment. That is, if the radio quality has deteriorated due to interference or the influence of a frequency selective transmission path in a frequency channel or a time slot that was being used for transmission in the disconnected segment, the radio quality improves in some cases due to the used frequency or the communication timing being changed. For this reason, the base station apparatus 101 changes the used frequency or the communication timing and instructs at least one of the relay apparatus or the partner apparatus forming the wireless link of the disconnected communication segment to attempt re-establishment of the wireless link of the communication segment. If deterioration of the radio quality is improved and the wireless link of the disconnected segment is re-established by changing the used frequency or the communication timing in this manner, the communication link between the base station apparatus 101 and the terminal apparatus 105 that was established before can be maintained.

Note that the base station apparatus 101 can receive the information indicating the used frequency or the communication timing at the time of disconnection together with the disconnection reason of the wireless link when the wireless link is disconnected, from a relay apparatus that formed the disconnected wireless link. Also, if the disconnection reason is deterioration of the radio quality, the base station apparatus 101 can transmit the instruction signal for instructing re-establishment of the wireless link using a frequency or timing that is different from the used frequency or the communication timing at the time of the disconnection to at least one of the relay apparatus and the partner apparatus that formed the wireless link of the disconnected segment. Accordingly, the base station apparatus 101 can designate a frequency or a communication timing that is not being used in another wireless link in the surrounding area of the disconnected communication segment, and thus can improve the probability that re-establishment of the wireless link will succeed.

On the other hand, if the reason for the disconnection of the wireless link notified from the relay apparatus is breakdown of the partner apparatus that established the wireless link together with the relay apparatus, the base station apparatus 101 can transmit an instruction for constructing a communication link with the terminal apparatus 105 without including the partner apparatus. Upon receiving the instruction, for example, the relay apparatus can search for a connection destination by measuring the radio quality between itself and a relay apparatus in the surrounding area. Note that the base station apparatus 101 can also transmit information on other relay apparatuses that are present in the surrounding area of the relay apparatus in the instruction. Note that the base station apparatus 101 can transmit the information of an apparatus whose hop number (number of instances of relay) in the communication segment with the base station apparatus 101 is less than or equal to a predetermined number among the other relay apparatuses that are present in the surrounding area of the relay apparatus. The predetermined number in this context can be, for example, a number that corresponds to the number of hops from the base station apparatus 101 to the disconnected segment. Accordingly, it is possible to prevent the number of hops of the switched communication link from being excessively high. When the information of the other relay apparatuses in the surrounding area is received, the relay apparatus can search for another relay apparatus with a preferable radio quality from among the other relay apparatuses indicated in this information, and can reconstruct the communication link by re-establishing the wireless link with the discovered other relay apparatuses.

Note that the base station 101 can transmit, for example, an instruction signal for causing reconstruction of the communication link to all of the multiple relay apparatuses forming the communication link. For example, if wireless links of at least a predetermined number of segments among the segments included in the communication link are disconnected, the base station apparatus 101 can transmit an instruction signal for performing reconstruction of this kind of communication link. Accordingly, if it is not sufficient to merely improve only some of the communication links, if the communication quality deteriorates when a partial path of the communication links is switched to another path, or the like, optimized communication links can be configured by resetting and re-establishing the communication links. Note that in this case, the base station apparatus 101 can determine the communication link (communication path) that is to be configured by the base station apparatus 101 by receiving a report of the radio quality with the other relay apparatuses in the surrounding area or the base station apparatus 101 from all of the relay apparatuses. At this time, the base station apparatus 101 can acquire position information and communication capability information of the relay apparatuses in advance, select the relay apparatuses forming the communication link based on the information, and transmit instruction signals for causing re-establishment of the communication link to the selected relay apparatuses. For example, the base station apparatus 101 can notify each relay apparatus of the information on the partner apparatus to which the apparatus is to connect. In this case, the communication link from the base station apparatus 101 to the terminal apparatus 105 is reconstructed by establishing the wireless link with the partner apparatus notified by the relay apparatus. Note that the communication capability information can include at least one of a supported frequency and a supported communication scheme. For example, it can be said that the greater the number of supported frequencies is, the more interference with the other apparatuses in the surrounding area can be suppressed, and the more the radio quality can be improved when the radio quality of the wireless link formed by the relay apparatus deteriorates. Also, it is possible to use a supported communication scheme to determine whether or not communication with another apparatus can be established or whether or not high-speed communication is supported. The base station apparatus 101 can suitably establish a communication link through relay based on these pieces of information.

The base station apparatus 101 can further transmit information on the timing of performing reconstruction when reconstruction of the communication link is to be performed. Accordingly, two apparatuses in each segment can execute processing for establishing a wireless link at the same timing due to the relay apparatuses performing an operation of switching the communication link at separate timings, and thus reconstruction of the communication link can be reliably performed. Also, by using this kind of common timing, it is possible to prevent a situation in which some of the segments corresponds to the reconstructed communication link and the other segments correspond to the non-reconstructed communication link.

Note that in the present embodiment, the base station apparatus 101 operates as a control apparatus for managing a communication link for communication between the base station apparatus 101 and the terminal apparatus 105, but there is no limitation to this. For example, the network node that can be connected by wire to the base station apparatus 101 or the like may also function as a control apparatus for managing the communication link between the base station apparatus 101 and the terminal apparatus 105.

Hereinafter, an example of a configuration of this kind of base station apparatus 101 (control apparatus) and the relay apparatuses, and an example of a flow of processing to be executed by these apparatuses will be described.

Hardware Configuration

Figure 2:
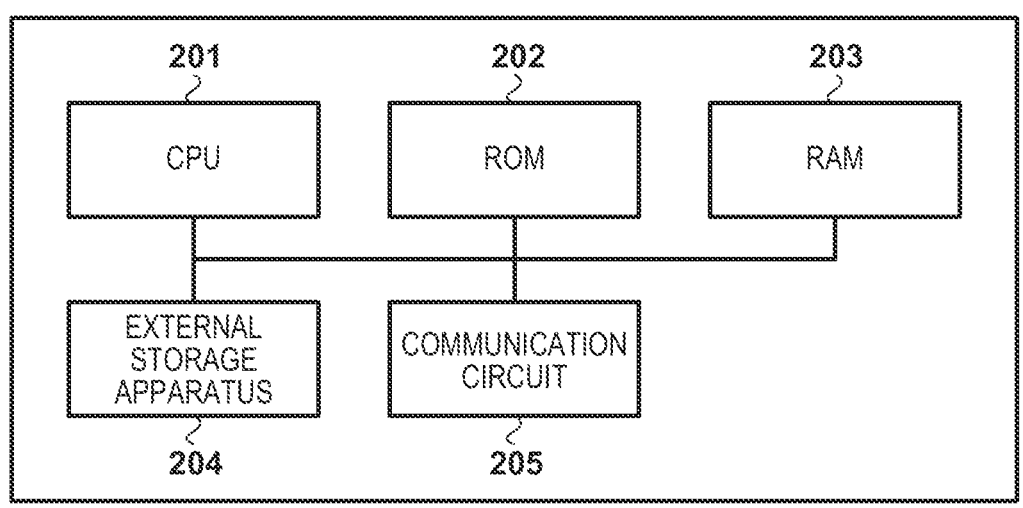
FIG. 2 is a diagram showing an example of a hardware configuration of a control apparatus according to a first embodiment.

FIG. 2 shows an example of a hardware configuration of the base station apparatus 101 and the relay apparatuses 102 to 104. In one example, the base station apparatus 101 and the relay apparatuses 102 to 104 have the hardware configurations shown in FIG. 2, and for example, each include a CPU 201, a ROM 202, a RAM 203, an external storage apparatus 204, and a communication circuit 205. In the base station apparatus 101 and the relay apparatuses 102 to 104, the above-described programs that realize the functions of the base station apparatus 101 and the relay apparatuses 102 to 104 and that are stored in one of the ROM 202, the RAM 203, and the external storage apparatus 204 for example are executed by the CPU 201.

Also, the base station apparatus 101 and the relay apparatuses 102 to 104 perform communication with the other apparatuses by, for example, controlling the communication circuit 205 using the CPU 201. Note that the communication circuit 205 of the base station apparatus 101 can perform communication with another base station apparatus or another network node (e.g., an external processing apparatus 131) through, for example, a wired line. Also, the communication circuit 205 of the base station apparatus 101 can perform wireless communication through LTE or NR between the relay apparatuses 102 to 104 by forming one or more (multiple) beams. The base station apparatus 101 can communicate with any relay apparatus (in the example of FIG. 1, the relay apparatus 102) using both NR and LTE, and can establish a connection through LTE with another relay apparatus that performs relay of some of the segments of the communication link that is formed by including relay performed by the relay apparatus. That is, the base station apparatus 101 establishes a direct connection through LTE and a direct connection through NR with the relay apparatus of the first hop of the communication link through relay, and establishes a direct connection through LTE and an indirect connection through a relay link in NR with the relay apparatuses of the second hop and onward. Note that in the configuration shown in FIG. 2, the base station apparatus 101 and the relay apparatuses 102 to 104 indicate schematic views that have one communication circuit 205, but may also have multiple communication circuits. For example, the base station apparatus 101 can have a first communication circuit for wired communication, a second communication circuit for wireless communication in NR, and a third communication circuit for wireless communication in LTE. The relay apparatuses 102 to 104 may also include, for example, a first communication circuit for NR and a second communication circuit for LTE.

Note that the base station apparatus 101 and the relay apparatuses 102 to 104 may also include dedicated hardware for executing functions, and a portion thereof may be executed by hardware and another portion may be executed by a computer for causing a program to operate. Also, all of the functions may also be executed by a computer and a program.

Functional Configuration

FIG. 3 shows an example of a functional configuration of the base station apparatus 101. The base station apparatus 101 includes, for example, a first communication unit 301, a second communication unit 302, and a communication link management control unit 303. The first communication unit 301 performs wireless communication using, for example, a wireless communication protocol conforming to the NR standard. The second communication unit 302 performs wireless communication using, for example, a wireless communication protocol conforming to the LTE standard. The communication link management control unit 303 uses the second communication unit 302 to perform management and control of the relay link formed by including one or more relay apparatuses that are used in communication performed by the first communication unit 301.

For example, when the communication link is formed, the communication link management control unit 303 stores and manages the information on the relay apparatuses forming the relay link. For example, when one communication link is formed by one or more relay apparatuses, the communication link management control unit 303 can store information identifying the communication link and information identifying the relay apparatuses in association with each other. For example, if the wireless link of at least some of the segments of the relay link is disconnected, the communication link management control unit 303 receives notification of the fact that disconnection was detected via the second communication unit 302 from the relay apparatuses that established the wireless links. Upon receiving notification of the fact that disconnection of the wireless links was detected, the communication link management control unit 303 can control the first communication unit 301 such that communication using the relay link including the wireless link is suppressed accordingly. For example, the communication link management control unit 303 controls the first communication unit 301 such that transmission of data addressed to the terminal apparatus connected to the relay apparatus on the downstream side with respect to the disconnected wireless link is stopped. For example, based on the information on the relay apparatuses forming the communication link stored during establishment of the communication link, the communication link management control unit 303 can specify the relay apparatus on the downstream side with respect to the disconnected wireless link and the terminal apparatus connected to the relay apparatus and prevent a signal addressed to the specified terminal apparatus from being transmitted by the first communication unit 301.

Also, upon receiving notification of the fact that the disconnection of the wireless link was detected, the communication link management control unit 303 can receive information indicating the reason for the disconnection via the second communication unit 302 through the notification or a signal other than the notification. Also, the communication link management control unit 303 may transmit an instruction signal for maintaining or reconstructing the communication link via the second communication unit 302 in response to the received reason. Note that at this time, based on the information of the relay apparatuses forming the communication link stored during establishment of the communication link, the communication link management control unit 303 can specify the relay apparatus to which the instruction signal is to be transmitted, such as the relay apparatus that is the transmission source of the notification and that constructed the disconnected wireless link. For example, if the reason for the disconnection is deterioration of the radio quality, the communication link management control unit 303 instructs re-establishment of the wireless link by increasing the transmission power, or changing the used frequency or the communication timing, and thus maintains the established communication link. At this time, the communication link management control unit 303 may also generate and transmit an instruction signal including information specifying a frequency or a time slot that is different from the frequency or the time slot that was used during disconnection as the frequency or the time slot that is to be used. In this case, for example, at the time when the wireless link is established, or when the wireless link is disconnected, the communication link management control unit 303 may also acquire information on the frequency or the time slot that was used during disconnection in the disconnected wireless link. Also, if the disconnection reason is breakdown of the relay apparatus, the communication link management control unit 303 may also perform reconstruction of the communication link so as not to include the relay apparatus. Furthermore, the communication link management control unit 303 may also transmit, via the second communication unit 302, an instruction for causing reconstruction of the communication link to all of the relay apparatuses forming the communication link in response to at least a predetermined number of the segments of the communication link being disconnected, or the like. For example, the communication link management control unit 303 can specify the relay apparatuses forming the communication link based on the information stored during establishment of the communication link, and can transmit an instruction for causing reconstruction of the communication link to all of the specified relay apparatuses. At this time, the communication link management control unit 303 can transmit the information on the timing of reconstructing the communication link via the second communication unit 302. Also, the communication link management control unit 303 can collect the position information for the multiple relay apparatuses and information on the communication capabilities thereof in advance, select the relay apparatus that is to form the reconstructed communication link based on the information, and transmit a signal instructing reconstruction of the communication link to the relay apparatuses. Note that the communication capability can include at least one of the supported frequency and the supported communication scheme, for example. Accordingly, reconstruction of the communication link can be suitably performed based on the positions and capabilities of the multiple relay apparatuses.

Next, FIG. 4 shows an example of a functional configuration of the relay apparatuses 102 to 104. In one example, the relay apparatuses each include a first communication unit 401, a second communication unit 402, a disconnection detection unit 403, and a disconnection reason determination unit 404. The first communication unit 401 performs wireless communication using, for example, a wireless communication protocol conforming to an NR standard. For example, in the communication link obtained through relay, the first communication unit 401 establishes a wireless link with the relay apparatus on the side opposite to the base station apparatus 101 as long as it is not the terminal end of the communication link, while establishing a wireless link with the apparatus (base station apparatus 101 or other relay apparatus) on the base station apparatus 101 side (upstream side), and performs relay of communication. Also, the first communication unit 401 can communicate with the terminal apparatus 105. The second communication unit 402 performs wireless communication with the base station apparatus 101 using, for example, a wireless communication protocol conforming to an LTE standard. The disconnection detection unit 403 performs the detection when, for example, a wireless link on the upstream side is disconnected among the wireless links established by the relay apparatus in the communication link through relay. Note that the disconnection detection unit 403 may also detect disconnection of a wireless link on the downstream side. Upon detecting the disconnection, the disconnection detection unit 403 notifies the base station apparatus 101 via the second communication unit 402 that the wireless link was disconnected. Note that if the disconnection of the wireless link on the downstream side was detected, the disconnection detection unit 403 may also notify the base station apparatus 101 via a non-disconnected segment of the communication link using the first communication unit 401. If the wireless link established between the relay apparatus and another apparatus is disconnected, the disconnection reason determination unit 404 can determine the reason why the wireless link was disconnected and notify the base station apparatus 101 of the determination result by including the reason in the notification of the fact that the wireless link was disconnected, or by using a signal separate from the notification of the fact that the wireless link was disconnected. Note that the disconnection detection unit 403 or the disconnection reason determination unit 404 may also notify the base station apparatus 101 of the information on the frequency or the time slot that was used during the disconnection. The second communication unit 402 may also notify the base station apparatus 101 of information such as the supported frequency or the supported communication scheme of the first communication unit 401.

Flow of Processing

Figure 5:
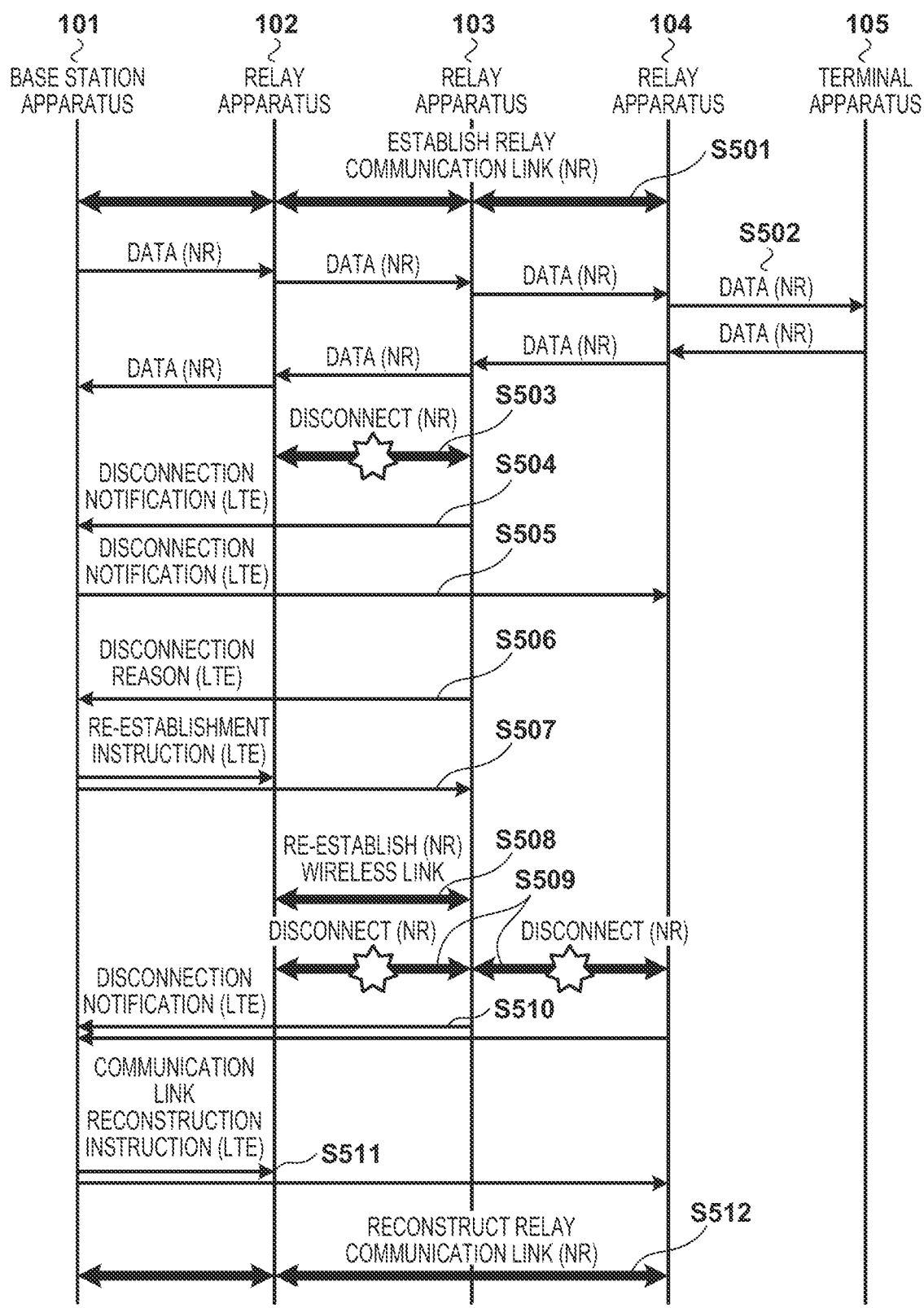
FIG. 5 is a diagram showing an example of a flow of processing executed by the wireless communication system according to the first embodiment.

Next, an example of a flow of processing executed in the wireless communication system shown in FIG. 1 will be described with reference to FIG. 5. Note that the processing of FIG. 5 is an example, and it is possible to execute only a portion of the processing, other processing may be additionally executed in addition to the processing, and the order of the processing may also be replaced. Also, in FIG. 5, it is assumed that a communication scheme conforming to the NR standard is used in relay communication, and it is assumed that a wireless communication line different from that of the NR standard for directly connecting the relay apparatuses and the base station apparatus 101 is established using a communication scheme conforming to the LTE standard. Note that in FIG. 5, "NR" and "LTE", which are written in parentheses, indicate whether the signal was transmitted and received using an NR or an LTE wireless communication line.

First, a relay communication link using NR is established such that communication is possible between the base station apparatus 101 and the terminal apparatus 105 (step S501). The processing of step S501 can be executed if data addressed to the terminal apparatus 105 is generated in the base station apparatus 101 or if the base station apparatus 101 is accessed by the terminal apparatus 105 using, for example, an LTE line. Also, the processing of step S501 may be executed in advance. That is, the relay communication link obtained through NR can be set in advance as shown in step S501 based on, for example, the geographical distribution of the amount of traffic that is generated, the distribution of the positions of the relay apparatuses, or the like. Then, a communication link using the relay communication link between the base station apparatus 101 and the terminal apparatus 105 may also be established based on at least the fact that the terminal apparatus 105 has entered the service area of a relay apparatus (in this case, the relay apparatus 104). When the relay communication link using NR is established, transmission/reception of data can be performed between the base station apparatus 101 and the terminal apparatus 105 (step S502).

Thereafter, for example, it is assumed that the wireless link between the relay apparatus 102 and the relay apparatus 103 in the relay communication link is disconnected (step S503). Upon doing so, the relay apparatus 103 detects the disconnection of the wireless link and notifies the base station apparatus 101 that disconnection was detected through LTE (step S504). Then, the base station apparatus 101 notifies, through LTE, the relay apparatus 104 on the downstream side with respect to the relay apparatuses 102 and 103 in the relay communication link that the relay communication link was disconnected on the upstream side (step S505). Accordingly, the base station apparatus 101 and the relay apparatus 104 on the downstream side can find out that the relay communication link cannot be used at that time. For this reason, the base station apparatus 101 can transmit the data using LTE instead of NR if, for example, there is data that is to be transmitted to the terminal apparatus 105, or the like (not shown). Note that the relay apparatus 102 may also detect the disconnection of the wireless link and notify the base station apparatus 101 of the disconnection. In this case, the relay apparatus 102 may also notify the base station apparatus 101 that the disconnection was detected using LTE, and may also use NR instead of LTE. This is because the relay apparatus 102 can transmit the information to the base station apparatus 101 through NR since the relay apparatus 102 is a relay apparatus on the base station apparatus 101 side among the two relay apparatuses constructing the disconnected wireless link in the relay communication link.

Note that the relay apparatus 103 (relay apparatus 102) can notify the base station apparatus 101 of the reason for disconnection together with the notification of the disconnection of step S504 or separately from the notification (step S506). Note that the relay apparatus 103 (relay apparatus 102) can notify the base station apparatus 101 of at least one of the used frequency or the used time slot when the disconnection occurred at, for example, the timing of step S504 or step S506. Note that, for example, the relay apparatuses may also notify the base station apparatus 101 of these pieces of information during establishment of the relay communication link of step S501. Upon receiving the reason for disconnection, the base station apparatus 101 transmits a re-establishment instruction according to the reason to the relay apparatus 102 and the relay apparatus 103 (step S507). Since the re-establishment instruction corresponding to the reason is as described above, it will not be described here. Thereafter, the relay apparatus 102 and the relay apparatus 103 perform re-establishment of the wireless link through NR (step S508). Due to re-establishing the wireless link, it is possible to perform communication through NR between the base station apparatus 101 and the terminal apparatus 105. Note that if, for example, the relay apparatus 102 breaks down, or the like, the base station apparatus 101 can transmit an instruction signal for establishing a communication link with the base station apparatus 101 directly or via a relay apparatus other than the relay apparatus 102, to the relay apparatus 103. In this case, the relay apparatus 103 establishes a wireless link with the base station apparatus 101 or another relay apparatus that is directly or indirectly connected to the base station apparatus 101, for example. Accordingly, the base station apparatus 101 can perform communication through NR with the terminal apparatus 105 using a communication link that does not include the relay apparatus 102. Note that in the following description, it is assumed that a wireless link between the relay apparatus 102 and the relay apparatus 103 has been re-established.

Thereafter, it is assumed that the disconnection of the wireless link between the relay apparatus 102 and the relay apparatus 103 and the disconnection of the wireless link between the relay apparatus 103 and the relay apparatus 104 coincide with each other (step S509). In this case, for example, the relay apparatuses on the downstream side in the respective wireless links (the relay apparatus 103 and the relay apparatus 104) transmit a notification that the wireless links have been disconnected to the base station apparatus 101 through LTE (step S510). In the present example, there is no relay apparatus on the downstream side with respect to the relay apparatus 104, and therefore notification of the disconnection from the base station apparatus 101 to the relay apparatus on the downstream side is not performed. The base station apparatus 101 determines that re-establishment of the communication link is to be performed in response to at least a predetermined number (e.g., 2) or wireless links being disconnected. At this time, the base station apparatus 101 determines what kind of topology is to be used to establish the communication link based on information such as the positions and communication capabilities of the relay apparatuses, for example. Here, for example, the base station apparatus 101 determines that a communication link in which a wireless link is established between the relay apparatus 102 and the relay apparatus 104 is to be established (step S511). In this case, the base station apparatus 101 performs reconstruction of the relay communication link by transmitting an instruction signal for establishing a wireless link to the relay apparatus 102 and the relay apparatus 104 (step S512). Note that information on the timing of re-construction of the relay communication link may also be included in the instruction signal. Also, information on the timing of the reconstruction may also be transmitted separately. Due to the relay communication link being reconstructed, it is possible to execute data communication between the base station apparatus 101 and the terminal apparatus 105.

Due to the above-described configuration, if some of the segments of the relay communication link is disconnected, the base station apparatus 101 and the relay apparatus that established the wireless link on the downstream side with respect to the segment can recognize that the relay communication link has been disconnected. Also, the base station terminal 101 can instruct re-establishment of the wireless link in the segment that was disconnected or reconstruction of the entire relay communication link according to the disconnection reason and the number of segments that were disconnected, and can resume communication through NR with the terminal apparatus 105.

In this manner, according to the present embodiment, the state of the communication path in relay communication can be suitably managed.

Second Embodiment

In relay communication, a backhaul line that is established between a base station apparatus (donor node) and a relay apparatus (relay node) and a frequency band that can be used in an access line by which the terminal apparatus connects to the base station apparatus or the like can be used in common. Also, establishment of the connection between the base station apparatus and the relay apparatus is executed similarly to that in the procedure by which a conventional terminal apparatus connects to a base station apparatus.

If the same frequency band is used for the backhaul line and the access line, it is possible that the terminal apparatus will unintentionally attempt to connect to the base station apparatus when the base station apparatus establishes a backhaul line with the relay apparatus, or after the establishment of the backhaul line. That is, although the base station apparatus transmits a synchronization signal or a notification signal at a predetermined period such that a backhaul line can be established when the relay apparatus is started up or restarted, since the backhaul line and the access line use the same connection procedure, the terminal apparatus can attempt to access the base station apparatus based on the synchronization signal or the notification signal. Although the base station apparatus can also establish a connection with the terminal apparatus, if an access attempt is needlessly performed by the terminal apparatus, a sufficient communication speed may be less likely to be obtained in the backhaul line. In the present embodiment, a method for dealing with this kind of problem will be discussed.

System Configuration

Figure 6:
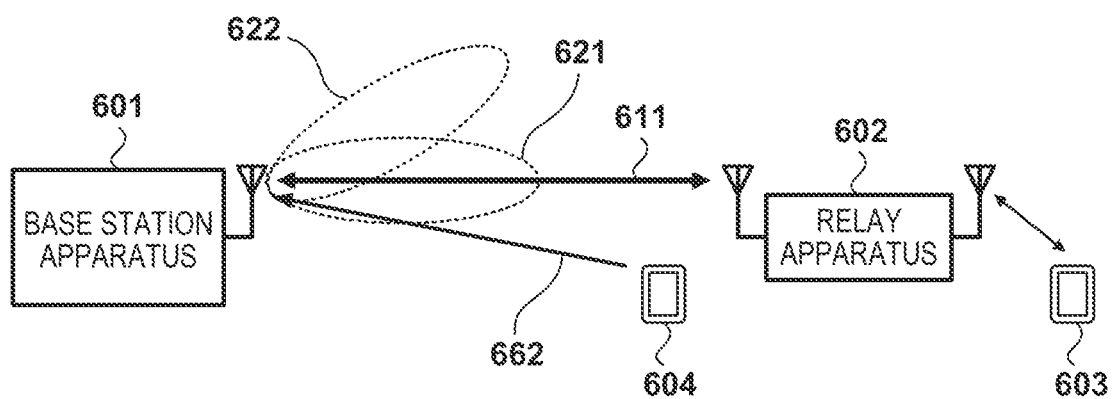
FIG. 6 is a diagram showing an example of a configuration of a wireless communication system accompanying relay transmission according to a second embodiment.

FIG. 6 shows an example of a configuration of a wireless communication system according to the present embodiment. The present wireless communication system is configured accompanying relay transmission, and in one example, is constituted by including a base station apparatus 601, a relay apparatus 602, and terminal apparatuses 603 and 604. Note that in FIG. 1, one base station apparatus 601, one relay apparatus 602, and two terminal apparatuses 603 and 604 are described, but many base station apparatuses, relay apparatuses, and terminal apparatuses may be present. Also, in FIG. 1, a relay path of one hop is formed by one relay apparatus 602, but a multi-hop relay path may also be formed by multiple relay apparatuses. Furthermore, in FIG. 1, one relay path is formed by one relay apparatus 602, but multiple relay paths may also be formed by multiple relay apparatuses. Also, for example, a relay path that branches at the relay apparatus 602 may also be formed due to the relay apparatus 602 connecting to multiple relay apparatuses. That is, there is no particular limitation on the topology of the relay path, and any configuration may be used. Note that although it is assumed that communication is performed in compliance with a fifth-generation NR (New Radio) standard in the present wireless communication system, the following discussion can be applied also to the case where communication is performed in compliance with a standard prior to the fifth generation such as LTE, or a future standard that has not yet been established.

The base station apparatus 601 can form one or more beams 621 and 622 and establishes a wireless link 611 for a backhaul line with the relay apparatus 602 using at least one of the beams 621 and 622 (in the case of FIG. 1, beam 621). Then, the relay apparatus 602 relays the communication executed by the base station apparatus 601 (e.g., the communication between the terminal apparatus 603 and the base station apparatus 601). Although it is assumed that the relay apparatus 602 is a fixed station that does not move in one example, the relay apparatus 602 may also be a mobile station depending on the case. However, in the present embodiment, it is assumed that the wireless link between the base station apparatus 601 and the relay apparatus 602 can ensure a sufficiently favorable radio quality, and the wireless link between the base station apparatus 601 and the relay apparatus 602 is called a backhaul line (backhaul link).

The backhaul line is established using a procedure similar to that of the access line established by the terminal apparatus with the base station apparatus. That is, the relay apparatus 602 establishes synchronization using the synchronization signal transmitted by the base station apparatus 601 and receives various pieces of information using the notification signal, and thereafter starts communication by executing processing such as establishing a radio resource control (RRC) connection with the base station apparatus 601. At this time, since the wireless communication environment is stable when, for example, the relay apparatus 602 is fixed, or the like, the base station apparatus 601 can make the transmission period for the synchronization signal or the notification signal for establishing the backhaul line longer than the transmission period for establishing the access line. However, since it is not the case that the synchronization signal and the notification signal are no longer transmitted, it is envisioned that, for example, the terminal apparatus 604 will attempt to establish an access line based on the synchronization signal and the notification signal. A backhaul line is generally used when relaying communication between many terminal apparatuses and the base station apparatus 601, and therefore it is often necessary to ensure a sufficiently large communication capacity. However, if the access line is established together with the backhaul line, a portion of the communication capacity will be shared with the access line, and therefore it will no longer be easy to ensure the communication capacity of the backhaul line. Also, the base station apparatus 601 can refuse establishment of the wireless link in response to a signal for attempting establishment of the access line from the terminal apparatus. However, since wasting of radio or computation resources for the refusal or the like, a case in which the signal from the terminal apparatus interferes with the backhaul line, and the like can be envisioned, it is essential to prevent needless attempts to establish this kind of access line from the terminal apparatus.

The base station apparatus 601 of the present embodiment transmits a notification signal including information indicating that the radio resource is being used for a backhaul line such that no attempt to establish an access line is needlessly made when a backhaul line is established or after a backhaul line is established. For example, the base station apparatus 601 is configured such that a predetermined field (e.g., of 1 bit) is ensured in the notification signal, and the bit (bit line) of the field indicates whether or not the base station apparatus that transmits the notification signal is using the radio resource for a backhaul line. Note that here, although it is described that a notification signal including "information indicating whether or not a radio resource is being used for a backhaul line" is transmitted, the information can be any information indicating whether or not to restrict requests to establish connection by a terminal apparatus. In one example, this information can be notified by a Master Information Block (MIB) in a physical broadcast channel (PBCH). Accordingly, the terminal apparatus that has established synchronization can recognize whether or not a radio resource is being used for a backhaul line in the base station apparatus without connecting to the base station apparatus. Note that this information may also be broadcasted using a System Information Block (SIB) in a physical downlink shared channel (PDSCH).

Upon receiving this kind of notification signal, the terminal apparatus 604 recognizes whether or not the base station apparatus that is the transmission source of the notification signal is using the radio resource by which the notification signal is transmitted for a backhaul line. Then, for example, if the radio resource is being used as a backhaul line, the terminal apparatus 604 determines that an attempt to establish an access line using that radio resource is not to be performed, that is, that connection is not to be requested to the base station apparatus that is the transmission source of the notification signal. On the other hand, for example, if the radio resource is not being used as a backhaul line, the terminal apparatus 604 determines that connection is to be requested to the base station apparatus that is the transmission source of the notification signal. In this manner, the terminal apparatus 604 no longer attempts establishment of an access line with a radio resource that is being used as a backhaul line, and therefore it is easier to ensure the communication capacity of the backhaul line.

Note that if multiple beams 621 and 622 can be formed as described above to provide separate wireless links, the base station apparatus 601 may also transmit a notification signal including the above-described information for each of the multiple beams. For example, in the example of FIG. 1, although a backhaul line has been established for the beam 621, no backhaul line has been established with the beam 622. In this case, the base station apparatus 601 transmits a notification signal including information indicating that the radio resource is being used for a backhaul line with the beam 621, and transmits a notification signal including information indicating that the radio resource is not being used for a backhaul line with the beam 622. In this case, the terminal apparatus 604 receives the notification signal via at least one of the beams and determines whether or not to request connection to the base station apparatus 601 based on the notification signal. For example, if the terminal apparatus 604 received the notification signals of both of the beams 621 and 622, the radio resource is being used for a backhaul line in beam 621, and therefore the terminal apparatus 604 determines that establishment of the connection via the beam 621 is not to be requested to the base station apparatus 601. On the other hand, since the radio resource is not being used for a backhaul line in the beam 622, the terminal apparatus 604 can request establishment of a connection to the base station apparatus 601 via the beam 622.

The base station apparatus 601 may also further transmit information indicating whether or not another base station apparatus within a predetermined range from the position of the base station apparatus 601 is using the radio resource for a backhaul line. Here, the predetermined range can be set as a range in which base station apparatuses to which a terminal apparatus that can receive a notification signal from the base station apparatus 601 can connect are distributed. In one example, the predetermined range can be a circular range centered about the base station apparatus 601 with a radius with a length that is twice the distance at which a signal transmitted from the base station apparatus 601 can be received. Note that this information can also be transmitted using MIB, SIB, or the like. Upon receiving this information, the terminal apparatus 604 can determine the base station apparatus to which the terminal apparatus is to request connection based on the information. That is, the terminal apparatus 604 can select a base station apparatus that is not using the radio resource for a backhaul line (or a beam by which the base station apparatus can provide a wireless link), and can request establishment of a connection to that base station apparatus. Accordingly, the terminal apparatus can avoid attempting to establish an access line using a radio resource that is being used for a backhaul line.

Note that the terminal apparatus 604 can exclude a base station apparatus or beam for which it has been indicated by the above-described notification signal that a radio resource is being used for a backhaul line from being a subject of measurement of the radio quality for a predetermined period. Accordingly, the terminal apparatus 604 no longer requests establishment of a connection since the base station or beam that is using a radio resource as a backhaul line is no longer measured for a predetermined period.

The base station apparatus 601 may also further transmit, for example, conditions under which use of a radio resource as an access line is allowed. In one example, this condition can be transmitted using MIB, SIB, or the like. If the notified condition is satisfied, the terminal apparatus 604 can request establishment of a connection even if the radio resource is being used as a backhaul line. Here, in one example, the conditions can include at least one of the transmitted data amount or the speed of the requested data communication being less than or equal to a predetermined value, and being an emergency call. Accordingly, in a condition under which the communication capacity of the backhaul line does not decrease significantly or if immediate communication such as an emergency call is needed, the base station apparatus can allow establishment of a connection with the terminal apparatus even if the radio resource is being used for a backhaul line. Note that if it is indicated by all of the received notification signals that the radio resources are being used for backhaul lines, that is, if there is no radio resource that is not being used for a backhaul line in the surrounding area, the terminal apparatus may also connect to a base station apparatus (or beam) that is using a radio resource as a backhaul line. In this case, the terminal apparatus may also transmit a connection establishment request signal together with information indicating that no base station apparatus (or beam) that is not using a radio resource as a backhaul line is present in the surrounding area. Note that the base station apparatus may also assign radio resources of such a degree that the communication capacity of the backhaul line does not decrease significantly to this kind of terminal apparatus.

The base station apparatus 601 may also transmit a notification signal including information indicating that the radio resource is being used for a backhaul line if the usage amount of the radio resource being used as a backhaul line (e.g., the total usage amount in a certain period) exceeds a predetermined amount. That is, even if a radio resource is being used for a backhaul line, if the usage amount thereof is less than or equal to a predetermined amount, the base station apparatus 601 can transmit a notification signal including information indicating that the radio resource is not being used for a backhaul line. Accordingly, if the amount of a radio resource that is being used for a backhaul line is small and there is leeway in the communication capacity, the base station apparatus can allow the terminal apparatus to request establishment of a connection. Note that the base station apparatus 601 may also periodically add up the usage amount of the radio resource used by the backhaul line and periodically update the information of the notification signal.

The base station apparatus 601 may also transmit a notification signal including information indicating that the radio resource is being used for a backhaul line in a period with a length that corresponds to the usage amount of the radio resource being used as a backhaul line. For example, if the usage amount of the radio resource being used for the backhaul line is 30%, the base station apparatus 601 can transmit a notification signal including first information indicating that the radio resource is being used for a backhaul line in a period that is 30+α % (α≥0) of the entire period. On the other hand, in this case, the base station apparatus 601 can transmit a notification signal including second information indicating that the radio resource is not being used for a backhaul line in a period that is the remaining 70−α %. Accordingly, if a notification signal including the second information is received, the terminal apparatus 604 can request connection to the base station apparatus 601. That is, according to this method as well, if the amount of radio resources that are being used for a backhaul line is small and there is leeway in the communication capacity, the base station apparatus can allow the terminal apparatus to request establishment of a connection.

Hereinafter, an example of a configuration of the base station apparatus and a terminal apparatus that execute the above-described processing and a flow of the processing that is executed will be described. Note that the above-described base station apparatus may also be replaced with a relay apparatus. For example, a relay apparatus can transmit a notification signal including the above-described information for a wireless link formed by the relay apparatus. That is, if a wireless link is established including two or more relay apparatuses, the relay apparatus that connects to another relay apparatus can transmit the above-described information by including it in the notification signal regarding the backhaul line established between the relay apparatuses. That is, the relay apparatus according to the present embodiment and the attached claims can be treated as the above-described base station apparatus.

Apparatus Configuration

Hereinafter, the configurations of the base station apparatus 601 and the terminal apparatus 604 according to the present embodiment will be described. Note that it is assumed that the hardware configurations of these apparatuses are similar to the configurations of the first embodiment. Note that the communication circuit 205 of the base station apparatus 101 can perform wireless communication with a relay apparatus 602 or the terminal apparatus 604 by forming one or more (multiple) beams. Also, in this case, the communication circuit 205 of the terminal apparatus 604 is configured to be able to connect to the base station apparatus 601 via at least one of the beams formed by the communication circuit 205 of the base station apparatus 601 or the relay apparatus 602 (depending on the case, the beams formed by the relay apparatus 602), and is configured to be able to communicate with the base station apparatus 601 through this connection. Note that, for example, the base station apparatus 601 can have a first communication circuit for wired communication with another base station apparatus 601 and a second communication circuit for wireless communication with the relay apparatus 602 or the terminal apparatus 604. Also, for example, the terminal apparatus 604 may include a first communication circuit for NR and a first communication circuit for LTE (Long Term Evolution). The terminal apparatus 604 may also have a wireless communication circuit relating to a standard that is not a cellular standard, such as a wireless LAN, and may further include a wired communication circuit that is used during wired connection through USB connection or the like, for example.

FIG. 7 shows an example of a functional configuration of the base station apparatus 601. As one example, the base station apparatus 601 includes a communication unit 701, a BH line usage determination unit 702, a notification signal generation unit 703, an other base station information acquisition unit 704, and a condition storage unit 705. Note that this functional configuration example is an example, and the base station apparatus 601 can include other functions of a general base station apparatus, and depending on the case, a portion or all of the functions shown in FIG. 7 need not be included in the base station apparatus 601.

The communication unit 701 performs wireless communication with the relay apparatus 602, and depending on the case, the terminal apparatuses 603 and 604. The communication unit 701 can perform wireless communication in accordance with, for example, the NR (New Radio) standard, which is a fifth-generation communication standard, or a communication standard of an earlier generation, such as LTE. Note that the communication unit 701 can form one or more beams with variable directivity by using, for example, an antenna array including multiple antenna elements, but there is no limitation to this. For example, the communication unit 701 need not form a beam using an omni-antenna, and for example, the communication unit 701 may also perform communication using an antenna with a fixed orientation direction, such as a parabola antenna. Depending on the case, the communication unit 701 may also connect to the relay apparatus 602 using a parabola antenna and may connect to the terminal apparatuses in the surrounding area using the omni-antenna or the antenna array. In this kind of case as well, there is a possibility that the terminal apparatus 604 will receive the signal transmitted using the beam emitted from the parabola antenna, and therefore the processing described in the present embodiment can be executed.

The BH line usage determination unit 702 determines whether or not the base station apparatus 601 is using a radio resource for a backhaul line. In one example, the BH line usage determination unit 702 determines that the radio resource is being used for a backhaul line in response to the communication unit 701 establishing a backhaul line with the relay apparatus 602. Also, the BH line usage determination unit 702 determines that the radio resource is being used for a backhaul line for a first beam in response to the communication unit 701 establishing a backhaul line with the relay apparatus 602 in a first beam among the multiple formed beams. Note that in this case, regarding the second beam that is different from the first beam of the above-described beams, the BH line usage determination unit 702 can determine that the radio resource is not being used for a backhaul line as long as the backhaul line has not been established with another relay apparatus. Also, if the actual usage amount of the radio resources is monitored in the established backhaul line and the usage amount exceeds a predetermined amount, the BH line usage determination unit 702 can determine that the radio resource is being used for a backhaul line. In this case, if the usage amount is less than or equal to a predetermined amount, the BH line usage determination unit 702 may also determine that the radio resource is not being used for the backhaul line, and if the usage amount is less than or equal to a second predetermined amount that is even smaller than the above-described predetermined amount, the BH line usage determination unit 702 may also determine that the radio resource is not being used for the backhaul line. Note that in the case where the second predetermined amount is used, if the usage amount is less than or equal to the predetermined amount and exceeds the second predetermined amount, the BH line usage determination unit 702 may also perform processing for determining that the radio resource is being used for a backhaul line in a period with a length corresponding to the usage amount. Note that the length corresponding to the usage amount can be a length that has a positive correlation, such as being proportional, to the ratio between the amount of radio resources that can be used and the actual usage amount. In this case, the BH line usage determination unit 702 outputs a determination result indicating that the radio resource is being used for the backhaul line in the period with the length corresponding to the usage amount, and can output a determination result indicating that the radio resource is not being used for the backhaul line in other periods. The BH line usage determination unit 702 may also perform processing for determining that the radio resource is being used for the backhaul line in a period with a length corresponding to the usage amount, even if the usage amount exceeds the predetermined amount or is less than or equal to the second predetermined amount. That is, if the usage amount exceeds the above-described predetermined amount, the BH line usage determination unit 702 may determine that the radio resource is being used for the backhaul line in all periods, and may determine that the radio resource is being used for the backhaul line in a period with a length corresponding to the usage amount without providing an upper limit such as the predetermined amount. Similarly, the BH line usage determination unit 702 may also determine that the radio resource is not being used for the backhaul line in all periods if the usage amount is less than or equal to the second predetermined amount, and need not provide a lower limit such as the second predetermined amount.

The notification signal generation unit 703 sets the value of the field indicating whether or not a radio resource is being used for a backhaul line using the determination result of the BH line usage determination unit 702 and thus generates a notification signal. For example, the notification signal generation unit 703 sets the value of the field to "1" in response to a determination result indicating that the radio resource is being used for the backhaul line, and sets the value of the field to "0" in response to a determination result indicating that the radio resource is not being used for a backhaul line. Note that this may also be reversed, and for example, when the value of the field is "0", it may be indicated that the radio resource is not being used for a backhaul line. If multiple beams are formed in the communication unit 701, the notification signal generation unit 703 can generate a separate notification signal for each beam, and can set a field indicating whether or not the radio resource is being used for a backhaul line for each beam. Also, the notification signal generation unit 703 may also include, into the notification signal, information indicating whether or not the radio resource is being used for a backhaul line in another base station apparatus (and a beam formed by that base station apparatus) that was acquired by the later-described other base station information acquisition unit 704. In this case, the notification signal generation unit 703 may also include only information on the other base station apparatus or the beam in which the radio resource is not being used for a backhaul line in the notification signal, or may include only the information of another base station apparatus/beam in which the radio resource is being used for a backhaul line in the notification signal. The notification signal generation unit 703 may also include, in the notification signal, a condition under which the terminal apparatus is allowed to request connection to a radio resource that is being used for a backhaul line, which is stored by the later-described condition storage unit 705.

The other base station information acquisition unit 704 acquires information indicating whether or not the radio resource is being used for a backhaul line in the other base station apparatus within a predetermined range from the position of the base station apparatus 601. For example, the other base station information acquisition unit 704 receives information indicating whether or not the radio resource is being used for a backhaul line in the other base station apparatus (or the beams formed by that base station apparatus) from that base station apparatus using an X2 or Xn interface through wired or wireless communication. Also, for example, the other base station information acquisition unit 704 can acquire at least one of identification information of the base station apparatus and identification information of the beam in which the radio resource is being used for a backhaul line. Note that the base station apparatus 601 itself can transmit information indicating whether or not the base station apparatus 601 is using the radio resource for a backhaul line or the identification information of the base station apparatus 601 to the other base station apparatus. Note that if multiple beams have been formed, the base station apparatus 601 can transmit the identification information of the beams in which the radio resource is being used for a backhaul line. Note that the predetermined range can be a circular range whose radius is a length that is twice the distance in which a signal transmitted by the base station apparatus 601 can be received, centered about the base station apparatus 601, for example. Also, for example, the predetermined range may also be set as a range from a position at which the signal transmitted by the base station apparatus 601 can be received using a beam in which the radio resource is being used for a backhaul line, to a position that is located a predetermined distance away, the predetermined distance being set according to the power that can be used when a general base station apparatus transmits a signal. Also, the predetermined range may also be a range of cell that is registered as a cell that has an adjacent relationship to the base station apparatus 601 (or the formed beam). In this case, the other base station information acquisition unit 704 can acquire the above-described information from some or all of the base station apparatuses corresponding to the cell registered in the adjacent cell list.

The other base station information acquisition unit 704 may also acquire the above-described information by requesting the information from another base station apparatus that is present in the predetermined range, and may also receive information that is periodically transmitted from another base station apparatus without performing a request. The information relating to the other base station apparatus can be input to the notification signal generation unit 703, and the notification signal generation unit 703 can generate the notification signal based on the information. At this time, the notification signal generation unit 703 may also generate a notification signal such that general information is transmitted as the information of another base station apparatus that is present at a position located away from the base station apparatus 601 and detailed information is transmitted as the information of another base station apparatus that is located at a position near the base station apparatus 601. For example, regarding the information of another base station apparatus that is located at a position near the base station apparatus 601, information on the beams generated by the base station apparatuses can be included in the notification signal. On the other hand, if a radio resource is being used for the backhaul line in at least one of the multiple beams of the far-away base station apparatus, information indicating that the radio resource is being used for a backhaul line in that base station apparatus can be included in the notification signal. In this manner, the information that is sent may differ according to the distance from the base station apparatus 601. Note that the information of the other base station apparatuses is not essential and the other base station information acquisition unit 704 may also be omitted.

If the radio resource is being used for a backhaul line, the condition storage unit 705 stores the condition under which the radio resource is allowed to be used as an access line. For example, the conditions can include at least one of the transmitted data amount or the speed of the requested data communication being less than or equal to a predetermined value, and being an emergency call. That is, communication of a degree such that the communication capacity of the backhaul line is not compressed, or communication needing to be established rapidly can be included as conditions. Note that the condition may also be set as appropriate by a communication carrier managing the base station apparatus 601, for example, and a condition other than the data amount/communication speed and whether or not it is an emergency call may also be set. The notification signal generation unit 703 can refer to the condition stored in the condition storage unit 705 as needed, and can generate a notification signal including information of the condition. Note that, for example, if specific conditions such as an emergency call are provided in common for all communication carriers, the common condition need not be included in the notification signal. This is because this kind of condition can be set in advance in the terminal apparatus. Note that the base station apparatus 601 may also reject all connection requests to a radio resource that is being used for the backhaul line without using the above-described condition, and in this case, the condition storage unit 705 can be omitted.

Next, an example of a functional configuration of the terminal apparatus 604 will be described with reference to FIG. 8. In one example, the terminal apparatus 604 includes a communication unit 801, a connection possibility determination unit 802, and a connection destination determination unit 803. Note that this functional configuration example is an example, the terminal apparatus 604 can include other functions of a general terminal apparatus, and depending on the case, some or all of the functions shown in FIG. 8 need not be included in the terminal apparatus 604. Note that the terminal apparatus 603 can also have a similar functional configuration.

The communication unit 801 performs wireless communication with the base station apparatus 601 and the relay apparatus 602. The communication unit 701 can perform wireless communication in compliance with, for example, the NR (New Radio) standard, which is a fifth-generation communication standard, or a communication standard of an earlier generation, such as LTE.

The connection possibility determination unit 802 analyzes a notification signal received via the communication unit 801 and determines whether or not the radio resource by which the notification signal was transmitted is being used for a backhaul line. For example, the connection possibility determination unit 802 can check a specific field in the notification signal and can perform the determination according to which bit, namely "0" or "1" has been set in the field. Note that if the base station apparatus 601 has transmitted the notification signal using multiple beams and at least some of the notification signals have been received, the connection possibility determination unit 802 performs determination of whether or not the radio resource is being used for the backhaul line for each beam. Then, for example, the connection possibility determination unit 802 prevents establishment of an access line from being requested to a base station apparatus or a beam in which a radio resource is being used for a backhaul line.

Also, if a condition under which requesting of the establishment of an access line is to be allowed is described in the notification signal, the connection possibility determination unit 802 acquires and stores the information on the condition. Also, the connection possibility determination unit 802 determines whether or not the communication executed through the connection satisfies the acquired condition when the terminal apparatus 604 attempts to connect to the network. Then, if the communication executed by the terminal apparatus 604 does not satisfy the condition regarding the base station apparatus or the beam in which the radio resource is being used for the backhaul line, the connection possibility determination unit 802 prevents establishment of an access line from being requested to the base station apparatus or the beam. On the other hand, if the communication executed by the terminal apparatus 604 satisfies the condition regarding the base station apparatus or the beam in which the radio resource is being used for the backhaul line, the connection possibility determination unit 802 determines that establishment of the access line is allowed to be requested to the base station apparatus or the beam. Here, as described above, the condition can include, for example, the amount of data, the communication speed, or being an emergency call.

Note that in one example, the connection possibility determination unit 802 can exclude the base station apparatus or the beam for which establishment of the access line is prevented from being requested, from being a subject of radio quality measurement for a predetermined period. This is because the terminal apparatus 604 no longer requests connection to the base station apparatus or the beam that is excluded from being a subject of radio quality measurement.

If there is information indicating whether or not a radio resource is being used for a backhaul line in the other base station apparatus in a notification signal received from the base station apparatus 601 (or the beam formed by the base station apparatus 601), the connection destination determination unit 803 acquires and stores the information. Also, the connection destination determination unit 803 determines the base station apparatus or the beam to which establishment of the access line is to be requested (connection destination) based on the acquired information of the other base station apparatus. For example, the connection destination determination unit 803 can prevent establishment of the access line from being requested to another base station apparatus in which the radio resource is being used for a backhaul line, or a beam formed by that base station apparatus. That is, the connection destination determination unit 803 can determine the connection destination based on, for example, the radio quality from among the base station apparatus or the beam in which the wireless resource is not being used for a backhaul line. Accordingly, the terminal apparatus 604 can select a base station apparatus or a beam in which the radio resource is not being used for a backhaul line from among the base station apparatuses in the surrounding area and the beams formed by those base station apparatuses, and can request establishment of an access line to the selected target.

Note that if there is no other base station apparatus or relay apparatus that can connect in the surrounding area, the terminal apparatus 604 may also request connection to a base station apparatus in which the radio resource is being used for a backhaul line. In this case, for example, the terminal apparatus 604 can include information indicating that there is no apparatus that can be connected to in the surrounding area in the connection request signal, and transmit the connection request signal. The base station apparatus 601 can allow connection for the terminal apparatus 604 in which this kind of information is included. However, the base station apparatus 601 may also give priority to the backhaul line, or may provide the communication service to the terminal apparatus 604 using a radio resource that is not being used by the backhaul line.

Flow of Processing

Next, several examples of a flow of processing executed by the wireless communication system according to the present embodiment will be described. Note that in the following examples, it is assumed that a "BH use" field of one bit indicating whether or not the radio resource is being used for a backhaul line is prepared in the notification signal, and the value being "1" indicates that the radio resource is being used for the backhaul line.

Figure 9:
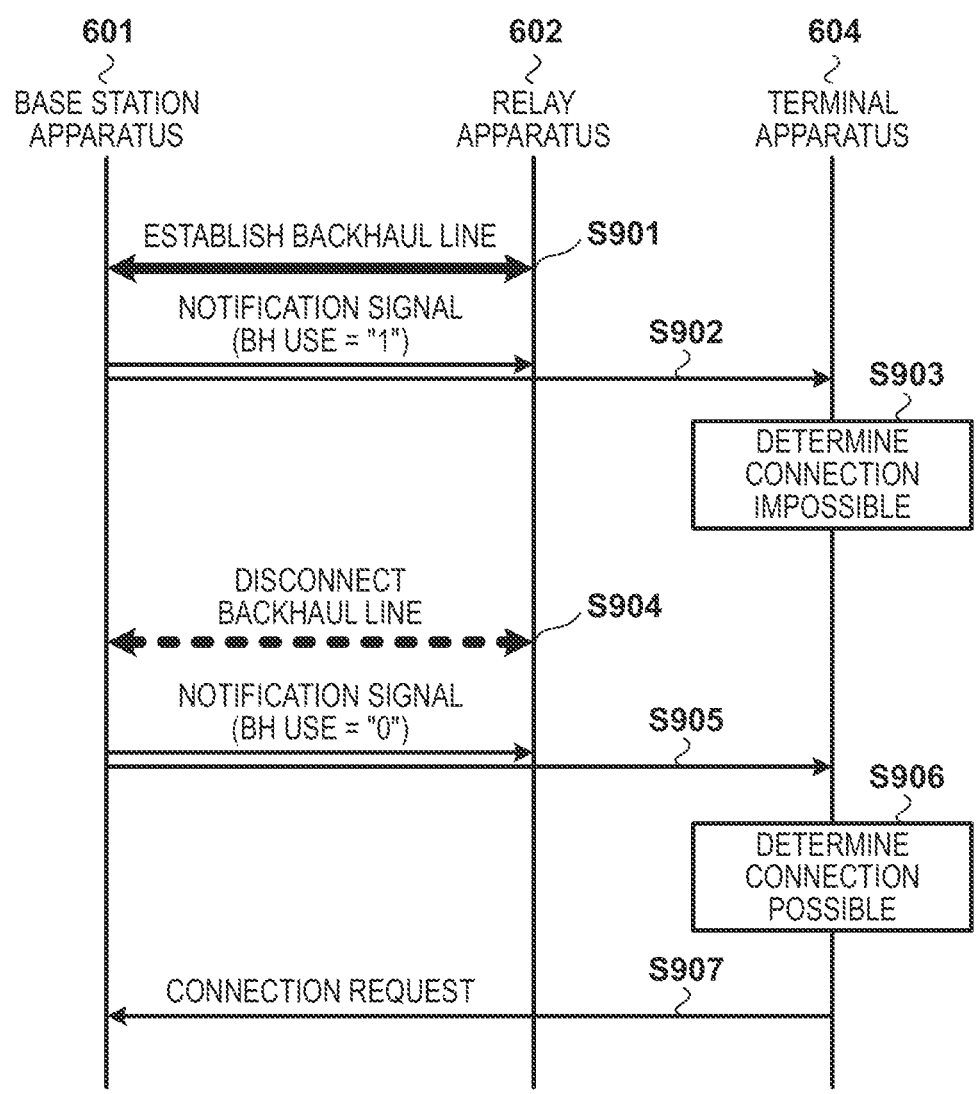
FIG. 9 is a diagram showing a first example of a flow of processing according to the second embodiment.

FIG. 9 shows a first example of a flow of processing executed by the wireless communication system according to the present embodiment. In the present processing, the base station apparatus 601 establishes a backhaul line with the relay apparatus 602 (step S901). In this case, the base station apparatus 601 periodically transmits a notification signal with a "BH use" field that is set to "I" (step S902). This notification signal is received by some or all of the communication apparatus (e.g., the relay apparatus 602 and the terminal apparatus 604) that can receive the signal transmitted from the base station apparatus 601. Note that if multiple beams have been formed, the base station apparatus 601 can separately transmit notification signals in which it is specified whether or not a radio resource is being used for a backhaul line in each of the multiple beams. Also, the base station apparatus 601 may also set the "BH use" field to "1" at the time when the processing for establishing the backhaul line is started, or may set the "BH use" field to "I" after the processing is complete and the backhaul line is established. Upon receiving the notification signal, the terminal apparatus 604 extracts the value set in the "BH use" field. Then, in this case, since "1" has been set, the terminal apparatus 604 can specify that the radio resource is being used for the backhaul line in the transmission source of the notification signal (i.e., the base station apparatus 601). Then, the terminal apparatus 604 determines that a connection request is not to be performed to the base station apparatus 601 based on the specification result (step S903).

Thereafter, it is assumed that the base station apparatus 601 has disconnected the backhaul line that was established with the relay apparatus 602 (step S904). The base station apparatus 601 sets the "BH use" field in the notification signal to "0" in response to the disconnection of the backhaul line. Note that the base station apparatus 601 may also set the "BH use" field to "0" at the time when the processing for disconnecting the backhaul line is started. The base station apparatus 601 transmits a notification signal with a "BH use" field that is set to "0" (step S905). Upon receiving the notification signal, the terminal apparatus 604 extracts the value set in the "BH use" field. Then, in this case, since "0" has been set, the terminal apparatus 604 can specify that the radio resource is not being used for the backhaul line in the transmission source of the notification signal (i.e., the base station apparatus 601). The terminal apparatus 604 determines that establishment of the access line is allowed to be requested to the base station apparatus 601 based on the specification result (step S906). Then, the terminal apparatus 604 can request connection to the base station apparatus 601 in which the radio resource is not being used for the backhaul line as needed (step S907).

Note that the base station apparatus 601 may also transmit the notification signal in which the "BH use" field is set to "0" while maintaining the state in which the backhaul line with the relay apparatus 602 is established. For example, the base station apparatus 601 can monitor the amount of communication that was actually executed on the established backhaul line, and can set the "BH use" field to "0" if the amount of communication is smaller than a predetermined amount. Also, the base station apparatus 601 may provide a period in which the "BH use" field is set to "0" and a period in which the "BH use" field is set to "1" using a time proportion corresponding to the amount of communication. That is, the base station apparatus 601 can set a period in which a connection request from a terminal apparatus is received and a period in which a connection request from a terminal apparatus is not received in a certain period, according to the amount of communication that was actually performed using the backhaul line. In this case, the terminal apparatus 604 can determine whether the connection destination is to be the base station apparatus 601, another base station apparatus, or a relay apparatus, according to the value of the "BH use" field of the notification signal received in the period in which the access line is to be established. According to this kind of method, a suitable amount of access of the terminal apparatus can be allowed according to the usage rate of the backhaul line of the base station apparatus 601, and thus needless access from many terminal apparatuses can be prevented.

In this manner, the terminal apparatus 604 can check whether or not the base station apparatus 601 is using the radio resource for a backhaul line by monitoring the predetermined field of the notification signal transmitted by the base station apparatus 601. Also, since the terminal apparatus 604 does not request connection while the base station apparatus 601 is using the radio resource for a backhaul line, it is possible to prevent the communication capacity of the backhaul line from decreasing due to the establishment of the access line. Also, since the terminal apparatus 604 no longer performs the connection request, it is also possible to reduce the processing load of the base station apparatus 601.

Next, a second example of a flow of processing executed by the wireless communication system will be described with reference to FIG. 10. In the present example, in the notification signal, a condition under which a connection request is allowed is notified in addition to information indicating that the radio resource is being used for a backhaul line. Note that, for example, multiple conditions can be defined in advance, and information indicating which of the multiple conditions are to be fulfilled in order to allow the connection request can be included in the notification signal. For example, it is possible to use a configuration in which a 3-bit condition designation field is prepared in the notification signal, and if the transmitted data amount being a predetermined value or less is a condition, "1" is set in the first bit, if the requested communication speed being less than or equal to a predetermined value is a condition, "1" is set in the second bit, and if the call being an emergency call is a condition, "1" is set in the third bit. In this case, due to "0" being set, it is possible to indicate that the connection request will not be allowed even if the conditions corresponding to the bits in which "0" has been set are satisfied. For example, by setting the field to "011", it is indicated that the connection request is not allowed even if the amount of data is small, but the connection request is allowed if the communication speed is less than or equal to a predetermined value and if the call is an emergency call. Note that the predetermined values relating to the data amount and the communication speed may be fixed values set in advance, and may be designated in another field in the notification signal. For example, a field indicating the amount of data or the communication speed of a predetermined number of bits may also be provided after the above-described 3-bit field. Note that if the amount of data and the communication speed are not used as conditions, the field indicating the amount of data or the communication speed may also be omitted.

Figure 10:
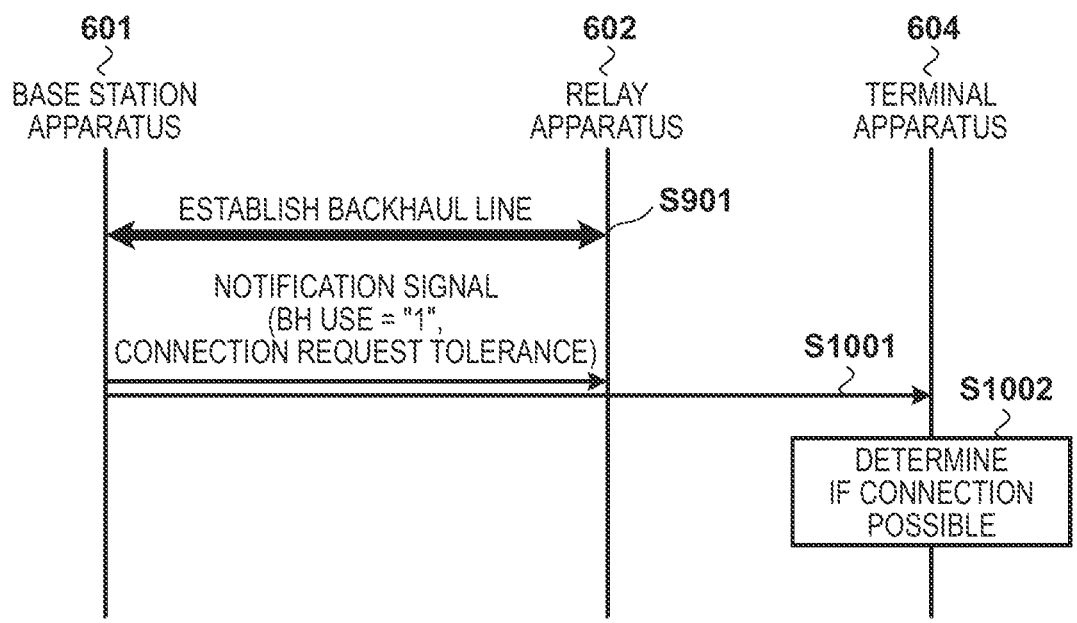
FIG. 10 is a diagram showing a second example of a flow of processing according to the second embodiment.

In FIG. 10, similarly to FIG. 9, the backhaul line is established between the base station apparatus 601 and the relay apparatus 602 (step S901). In this case, the base station apparatus 601 sets the above-described "BH use" field to "1" and transmits the notification signal including information on conditions under which the connection request is allowed (step S1001). Upon receiving the notification signal, the terminal apparatus 604 checks the "BH use" field and determines that the connection request is allowed if the value of the field is "0". On the other hand, in the case of FIG. 10, since the value of the "BH use" field is set to "1", the terminal apparatus 604 next acquires the information of the condition under which the connection request is allowed. Also, when the establishment of the access line is requested, the terminal apparatus 604 determines whether or not the acquired condition is satisfied (step S1002), and if the condition is satisfied, the connection can be requested to the base station apparatus 601. Note that if the condition is not satisfied, the terminal apparatus 604 performs a connection request to, for example, the other base station apparatus and the relay apparatus without performing this kind of connection request to the base station apparatus 601. Accordingly, connection is allowed for a terminal apparatus 604 that satisfies a limited condition such as a case in which there is no significant influence on the communication capacity of the backhaul line or an emergency call, and a communication service that is needed for a terminal apparatus can be provided while maintaining the quality of the backhaul line.

Figure 11:
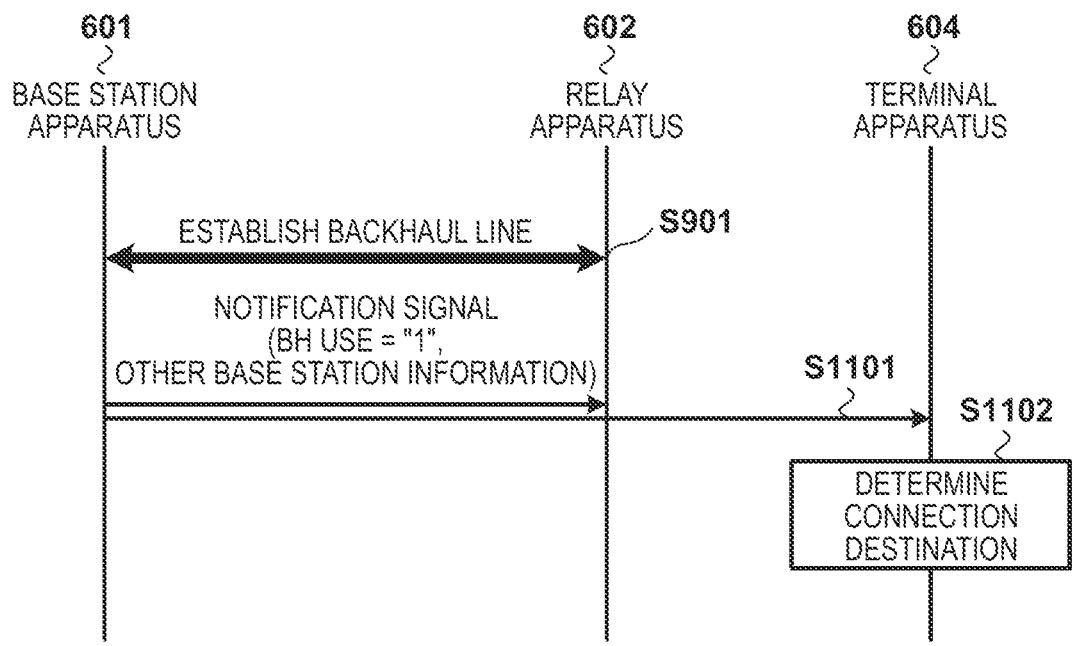
FIG. 11 is a diagram showing a third example of a flow of processing according to the second embodiment.

Next, a third example of a flow of processing executed by the wireless communication system will be described with reference to FIG. 11. In the present example, the base station apparatus 601 transmit information indicating whether or not the radio resource is being used for the backhaul line to not only the base station apparatus 601 but also another base station apparatus in the surrounding area (depending on the case, a relay apparatus) by including the information in the notification signal (step S1101). The terminal apparatus 604 determines the base station apparatus or the relay apparatus that is to be the connection destination based on the information (step S1102). For example, the terminal apparatus 604 can determine that an apparatus in which the radio resource is not being used for the backhaul line and has a radio quality with a predetermined value or more among the base station apparatuses or relay apparatuses in the surrounding area is a connection destination. At this time, for example, since needless measurement for beams and the like in which a connection request is not allowed is no longer performed due to apparatuses in which the radio resource is being used for a backhaul line being excluded from being a subject of radio quality measurement, the terminal apparatus 604 can reduce the consumed power and the processing load.

As described above, due to the base station apparatus 601 transmitting whether or not the radio resource is being used for the backhaul line using the notification signal, the terminal apparatus 604 no longer needlessly performs a connection request to the base station apparatus 601. Accordingly, the communication capacity and the communication quality of the backhaul line can be kept high. Note that "whether or not the radio resource is being used for the backhaul line" may be replaced with "whether or not a connection request from the terminal apparatus 604 is allowed", and a factor for determining whether or not to allow the connection request does not necessarily need to be whether or not there is use of the backhaul line. That is, the above-described configuration and processing can be applied in any state in which it is necessary to avoid needless connection requests performed by the terminal apparatus 604.

According to the present embodiment, it is possible to prevent needless access from being performed by the terminal apparatus to the backhaul line between the base station apparatus and the relay apparatus.

Although a representative configuration and flow of processing according to the present embodiment has been described above, this is merely an example, and various modifications and changes with respect to the embodiment described in the present specification within the scope of claims are also naturally included in the scope of rights of the present invention.

The present invention is not limited to the above embodiments and various changes and modifications can be made within the spirit and scope of the present invention. Therefore, to apprise the public of the scope of the present invention, the following claims are made.

According to the present invention, at least one of the problems in relay communication can be solved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A first relay apparatus included in a wireless communication system that includes a control apparatus, the first relay apparatus and a second relay apparatus, the first relay apparatus comprising:
   one or more processors; and
   one or more memories that store a computer-readable instruction for causing, when executed by the one or more processors, the first relay apparatus to:
   perform, using a first communication method, communication relay in at least a part of a communication link used for communication conducted by the control apparatus, wherein the second relay apparatus performs communication relay in at least another part of the communication link, and wherein the first relay apparatus performs communication relay in at least a part of a first link, included in the communication link, between the control apparatus and the second relay apparatus; and
   transmit, to the control apparatus and using a second communication method different from the first communication method, information indicating that disconnection of a part of a second link, included in the communication link, between the control apparatus and the first relay apparatus is detected.

2. The first relay apparatus according to claim 1, wherein the first communication method is a method compliant with a fifth generation cellular communication standard, and the second communication method is a method compliant with a Long Term Evolution (LTE) standard.

3. The first relay apparatus according to claim 1, wherein the first relay apparatus receives, using the second communication method, a signal instructing to reestablish a part of the communication link, of which the disconnection is detected.

4. The first relay apparatus according to claim 3, wherein the first relay apparatus re-establishes, using the first communication method, connection on the part of communication link, of which the disconnection is detected based on the signal received from the control apparatus using the second communication method.

5. A communication method executed by a first relay apparatus included in a wireless communication system that includes a control apparatus, the first relay apparatus and a second relay apparatus, the communication method comprising:
  performing, using a first communication method, communication relay in at least a part of a communication link used for communication conducted by the control apparatus, wherein the second relay apparatus performs communication relay in at least another part of the communication link, and wherein the first relay apparatus performs communication relay in at least a part of a first link, included in the communication link, between the control apparatus and the second relay apparatus; and
  transmitting, to the control apparatus and using a second communication method different from the first communication method, information indicating that disconnection of a part of a second link, included in the communication link, between the control apparatus and the first relay apparatus is detected.

* * * * *